United States Patent
Nakayama et al.

(10) Patent No.: US 8,335,641 B2
(45) Date of Patent: Dec. 18, 2012

(54) ROUTE GUIDANCE SYSTEMS, METHODS, AND PROGRAMS

(75) Inventors: Takaaki Nakayama, Okazaki (JP); Shino Oonishi, Okazaki (JP); Kensuke Takeuchi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 275 days.

(21) Appl. No.: 11/604,738

(22) Filed: Nov. 28, 2006

(65) Prior Publication Data

US 2007/0124072 A1    May 31, 2007

(30) Foreign Application Priority Data

Nov. 30, 2005  (JP) ................................. 2005-346663

(51) Int. Cl.
*G01C 21/00* (2006.01)
(52) U.S. Cl. .......... 701/408; 701/23; 701/116; 701/428; 701/431; 340/990; 340/995.2; 340/995.27; 340/988
(58) Field of Classification Search ............. 701/211, 701/201, 209, 23, 408, 428, 431, 437; 340/988, 340/540, 990, 995.2, 995.27
See application file for complete search history.

(56) References Cited

U.S. PATENT DOCUMENTS

| | | | | |
|---|---|---|---|---|
| 5,410,486 A | * | 4/1995 | Kishi et al. | 701/211 |
| 6,061,628 A | * | 5/2000 | Hayashi et al. | 701/208 |
| 6,466,867 B1 | * | 10/2002 | Sakashita | 701/211 |
| 6,510,386 B2 | * | 1/2003 | Sakashita | 701/211 |
| 2001/0049582 A1 | * | 12/2001 | Sakashita | 701/211 |
| 2005/0171688 A1 | * | 8/2005 | Fujita et al. | 701/201 |
| 2007/0106460 A1 | * | 5/2007 | Nakayama et al. | 701/201 |

FOREIGN PATENT DOCUMENTS

| | | |
|---|---|---|
| DE | 103 27 869 A1 | 1/2005 |
| EP | 0 803 853 A1 | 10/1997 |
| EP | 1 074 960 A1 | 2/2001 |
| JP | A 06-295399 | 10/1994 |
| JP | A-2002-236029 | 8/2002 |
| JP | A-2003-254771 | 9/2003 |
| JP | A-2005-165752 | 6/2005 |
| JP | A-2005-214883 | 8/2005 |
| JP | A-2005-308427 | 11/2005 |

OTHER PUBLICATIONS

Feb. 2, 2010 Notification of Reason(s) for Refusal w/Partial Translation issued in Japanese Patent Application No. 2005-346663.
Japanese Patent Office, Decision of Refusal dated Apr. 27, 2010 in Japanese Patent Application No. 2005-346663 w/English-language Translation.

* cited by examiner

Primary Examiner — Redhwan K Mawari
(74) Attorney, Agent, or Firm — Oliff & Berridge, PLC

(57) ABSTRACT

Systems, methods, and programs search for a route to a destination and set a recommended travel lane, based on the searched for route. The systems, methods, and programs provide lane guidance to lead the vehicle into the recommended lane. The systems, methods, and programs receive a current position of the vehicle and determine a movement direction of the vehicle, based on the received current position and the recommended lane. The systems, methods, and programs determine whether to provide lane guidance based on the movement direction of the vehicle.

17 Claims, 2 Drawing Sheets

ROUTE GUIDANCE SYSTEMS, METHODS, AND PROGRAMS

INCORPORATION BY REFERENCE

The disclosure of Japanese Patent Application No. 2005-346663 filed on Nov. 30, 2005, including the specification, drawings and abstract is incorporated herein by reference in its entirety.

BACKGROUND

1. Related Technical Fields

Related technical fields include route guidance systems, methods, and programs.

2. Description of the Related Art

A navigation apparatus mounted on a vehicle detects a current position of the vehicle by GPS (global positioning system), reads out map data from a data storing section, displays a map screen on a display section, and displays the vehicle position on a map of the area surrounding the vehicle. Therefore, a driver of the vehicle may drive the vehicle using the vehicle position displayed on the map as an aid.

When the driver inputs a destination and sets a route search condition, a route from the current position as a starting point to the destination is searched on the basis of the search condition. The searched route is displayed together with the vehicle position on the map, and the driver is provided guidance along the searched route. Therefore, the driver may drive the vehicle following the searched route.

During route guidance, when there is a specific intersection at which the vehicle must turn right or left, additional guidance is executed, such as by voice output, for example, before the vehicle arrives at the intersection. In order for route guidance to be executed, one or more guidance points are set at locations at set distances before the turn intersection along the specified route. When the vehicle arrives at the guidance points, additional guidance for each of the guidance points is output by voice. Such a system is described in Japanese Patent Application Publication No. JP-A-6-295399.

Also, if the road traveled to the guidance intersection has a plurality of roads, a specific lane is set as a recommended lane, and lane guidance is provided so that the vehicle will drive in the recommended lane.

SUMMARY

However, in the conventional navigation system described above, if the driver fails to hear the route guidance, or if the vehicle must turn right at the guidance intersection, but the recommended lane is the most left lane. As a result, the driver may be unable to drive the vehicle according to the lane guidance and end up driving in a lane other than the recommended lane by mistake. That is, it is sometimes, according to the conventional navigation system, it is impossible to drive the vehicle along the specified route.

Moreover, in the conventional navigation system described above, even if the vehicle is already traveling in the recommended lane, lane guidance is provided repeatedly. As a result, the driver may feel that the superfluous lane guidance is annoying.

Exemplary implementations of the broad principles described may allow a vehicle to travel reliably according to lane guidance and/or prevent the vehicle from being driven in a lane other than the recommended lane by mistake, without making the driver feel annoyed by superfluous lane guidance.

Exemplary implementations provide systems, methods, and programs that may search for a route to a destination and may set a recommended travel lane, based on the searched for route. The systems, methods, and programs may provide lane guidance to lead the vehicle into the recommended lane. The systems, methods, and programs may receive a current position of the vehicle and may determine a movement direction of the vehicle, based on the received current position and the recommended lane. Then, the systems, methods, and programs may determine whether to provide lane guidance based on the movement direction of the vehicle.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
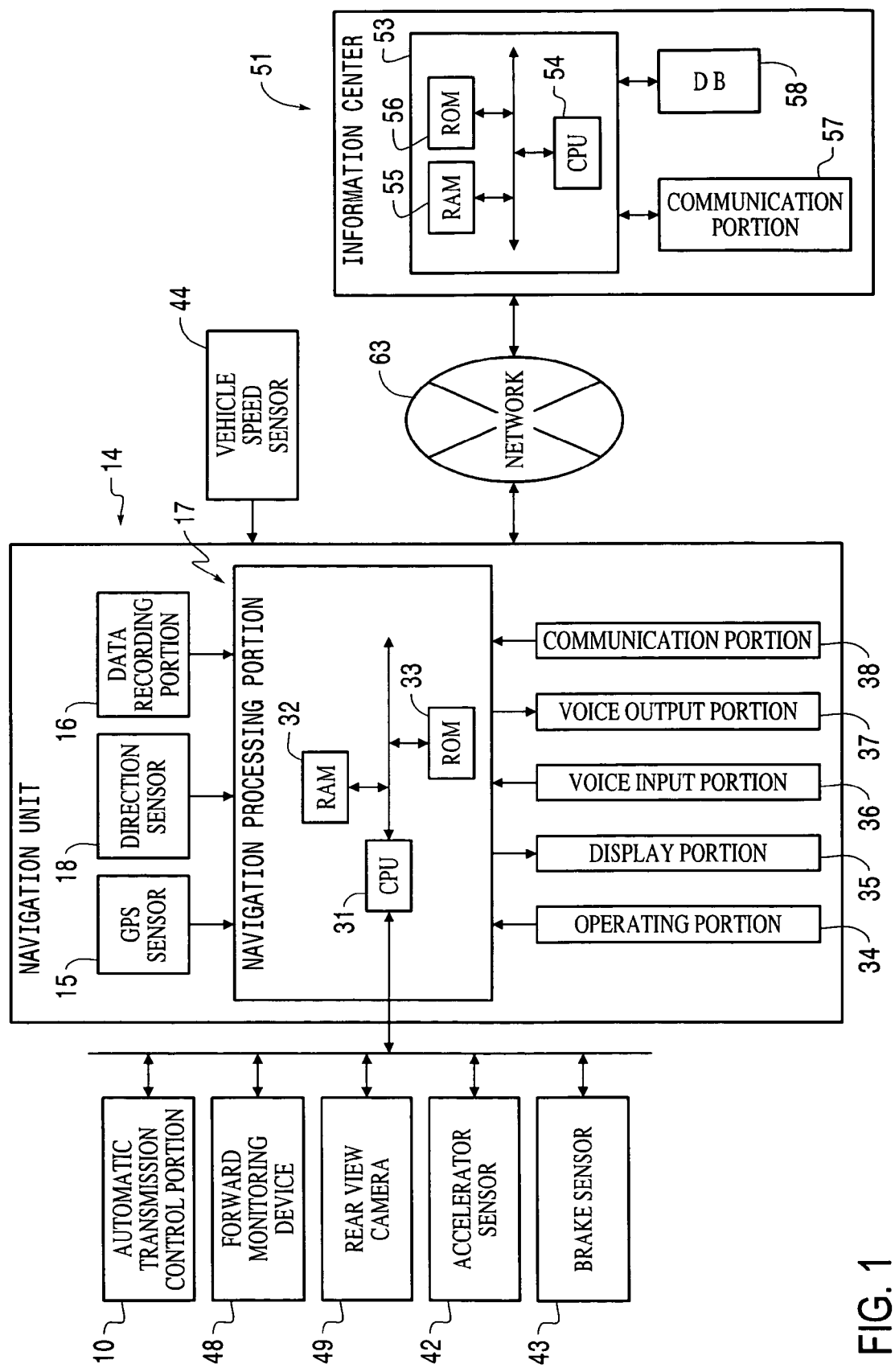
FIG. 1 is a diagram showing an exemplary navigation system according to an embodiment of the present invention.

FIG. 1 shows an exemplary navigation system. As shown in FIG. 1, the navigation system may include, for example, an automatic transmission control portion 10. The automatic transmission control portion 10 may control a power train for changing gear at a predetermined transmission gear ratio such as, for example, a continuously variable transmission (CVT), an automatic transmission, and/or an electric drive system.

The navigation system may include, for example, an information terminal, such as, for example, an on-board navigation unit 14 mounted on a vehicle. The navigation system may include, for example, a network 63 and an information center 51 as an information provider.

The navigation unit 14 may include, for example, a GPS sensor 15 for detecting a current position of the vehicle, a memory (e.g., data storing portion 16) for storing map data and various types of information, and a controller (e.g., navigation processing portion 17) for performing various calculations such as navigation processing on the basis of input information. The navigation unit 14 may include, for example, a direction sensor 18 for detecting a vehicle direction, an operating portion 34 for receiving input from a user, a display portion 35 for displaying various images on a screen (not shown) to guide the driver, and an audio input portion (e.g., voice input portion 36) for performing audio input. The navigation unit 14 may include, for example, an audio output portion (e.g., voice output portion 37) for outputting various audio messages to aid the driver and a communication portion 38. The GPS sensor 15, the data recording portion 16, the direction sensor 18, the operating portion 34, the display portion 35, the voice input portion 36, the voice output portion 37, and the communication portion 38 may be connected to the navigation processing portion 17.

The automatic transmission control portion 10, a forward monitoring device 48 that is mounted at a predetermined position in the front part of the vehicle for monitoring the area in front of the vehicle, a rear view camera 49 that is mounted at a predetermined position in the rear part of the vehicle, an accelerator sensor 42 for detecting the degree of opening of an accelerator pedal (not shown), a brake sensor 43 for detecting the level of braking applied to the vehicle through a brake pedal (not shown), and a vehicle speed sensor 44 for detecting the vehicle speed may also be connected to the navigation processing portion 17. Note that, for example, the accelerator sensor 42 and the brake sensor 43 may detect information related to vehicle operation by the driver.

The GPS sensor 15 may detect a current position on the earth by receiving a radio wave from a satellite and may also detect a time. However, a distance sensor, a steering sensor, and/or an altimeter (not shown) may be used independently or together instead of the GPS sensor 15. A gyro sensor or a geomagnetic sensor may be used as the direction sensor 18. Note that, these sensors are not needed when the GPS sensor has a function of detecting, for example, a vehicle direction and a vehicle speed.

The data storing portion 16 may include a map database including a map data file to store map data therein. The map data may include intersection data regarding intersections, node data regarding nodes, road data regarding road links, search data processed for searching, facility data regarding facilities, and feature data regarding features on a road. As used herein, the term "road link" refers to, for example, a road or portion of a road. For example, according to one type of road data, each road may consist of a plurality of componential units called links. Each link may be separated and defined by "nodes," for example, an intersection, an intersection having more than three roads, a curve, and/or a point at which the road type changes.

Road features may include an object set or formed on a road that provides travel information to the driver or that provides travel guidance to the driver such as, for example, a line, a road sign, a crosswalk, a manhole, and/or a traffic light. The line may be a stop line indicating where a vehicle should stop, a line separating vehicular lanes, or a line indicating a parking space. The road sign may be an information sign indicating a direction of a lane by means of an arrow, a warning sign such as "STOP" to notify the driver of a stop line or a direction sign such as "the direction of XX" to provide directions to a location. The feature data may include position information indicating the positions of features by means of coordinates and/or image information indicating features by means of images. Note that, the stop line may include an entrance from a non-priority road to a priority road, a railroad crossing, and/or an intersection with a blinking red light.

The road data regarding the lanes may include lane data such as a lane number for each lane on roads and/or lane position information. The data storing portion 16 may store data for outputting predetermined information by the voice output portion 37.

Further, the data storing portion 16 may include a statistical database including a statistical data file and/or a travel history database including a travel history data file, and statistical data is stored in the statistical data file as past record data as is travel history data in the travel history data file.

The statistical data may include a past record of traffic information, that is, history information indicating travel history. The statistical data may include various types of information, that is, for example, past traffic information provided by a road traffic information center (not shown) such as a VICS (Vehicle Information and Communication System), road traffic census information indicating traffic volume obtained by a road traffic census provided by the National Land and Transportation Ministry, and road timetable information provided by the National Land and Transportation Ministry, and such information may be used individually/collectively, modified, or undergo statistical processing, if needed. Note that, congestion prediction information for predicting traffic congestion may be added to the statistical data. In that case, detailed conditions such as date and time, day of the week, weather, various events, season, facility information (presence or absence of large facilities such as a department store and/or a supermarket) may be added to the history information to create the statistical data.

As data items for the statistical data, a link number for each of a plurality of road links, a direction flag indicating a travel direction, a type of information, a congestion degree at each of a plurality of predetermined times, a link required travel times indicating the lengths of time required to travel the road links at predetermined times, and/or average data of the link required time for each day of the week may be included.

The travel history data may be collected from a plurality of vehicles, that is, from the vehicle mounted with the navigation apparatus and/or other vehicles, by the information center 51. The travel history data may include past record information indicating the travel record of roads along which each vehicle has traveled and is calculated and stored as probe data on the basis of travel data.

As data items for the travel history data, a link required travel time and a congestion degree for each road link at a predetermined time may be included. Note that, the travel history data may be added to the statistical data. Further, the congestion degree may be displayed as a congestion indicator, for example, "congested," "crowded," and "not congested," indicating the degree of traffic congestion.

The data storing portion 16 may include a disk (not shown) such as a hard disk, a CD, a DVD, or an optical disk to store the various data described above and also include a head (not shown) such as a readout/writing head to read out/write various data. For example, a memory card may be used as the data storing portion 16. Note that, an external storage device or a memory card may be one of the disks described above.

The map database, the statistical database, and the travel history database may be included in the data storing portion 16. However, one or more of the map database, the statistical database, and the travel history database may be included in the information center 51 instead.

The navigation processing portion 17 may include, for example, a CPU 31 as a control device as well as a calculating device for controlling the whole navigation apparatus 14, a RAM 32 as a working memory for helping the CPU 31 to perform various calculations, a ROM 33 for storing a control program and various programs for searching for a route to a destination or for route guidance, and a flash memory (not shown) for storing various data and programs. Note that, an internal storage device may be the RAM 32, the ROM 33, or the flash memory.

Various programs may be stored in the ROM 33 and various data may be stored in the data storing portion 16. However, such programs and data may be stored on, for example, a disk. In this case, the programs and/or data may be read out from the disk and may be written to a flash memory. Therefore, the programs and/or data may be updated by changing the disk. Further, control program and/or data of the automatic transmission control portion 10 may be stored on the disk as well. Then the programs and data may be received through the communication portion 38 and stored in the flash memory of the navigation processing portion 17.

By the driver's operation, the operating portion 34 may be used for correcting a current position when the vehicle starts moving, inputting a starting point and a destination, inputting a point to be passed, and activating the communication portion 38. A keyboard or a mouse that is different from the display portion 35 may be used as the operating portion 34. Also, a touch panel with image operating portions such as various keys, switches, and buttons may be used as the operating portion 34. Such keys, switches, and buttons may be displayed on a screen of the display portion 35 and touched or clicked for a predetermined input operation.

A display may be used as the display portion 35. In various screens displayed on the display portion 35, for example, a current position of the vehicle as a vehicle position, a vehicle direction, a map, a searched route, guide information along the searched route, traffic information, a distance to a next intersection on the searched route, and/or a travel direction at the next intersection may be displayed. Further, operating instructions and guidance of operating menu/keys of the image operating portion, the operating portion 34, and the audio input portion 36 as well as an FM multiplex telecasting program name may be displayed in the various screens of the display portion 35.

The voice input portion 36 may include a microphone (not shown) to input necessary information by audio. The voice output portion 37 includes a speech synthesis device and a speaker (not shown) to output an audio message synthesized by the speech synthesis device for, for example, the searched route, guidance information, and/or traffic information.

The communication portion 38 may include a beacon receiver and/or an FM receiver. The beacon receiver (for example, electric wave beacon and/or optical beacon) may receive various types of information such as current traffic information and general information sent from, for example, the road traffic information center via, for example, an electric wave beacon device and/or optical beacon device provided along a road. The FM receiver may also receive such information as multiple broadcasts via an FM broadcast station. The traffic information may include, for example, congestion information, road sign information, parking lot information, traffic accident information, and/or information on the busy status of service areas. The general information may include, for example, news and weather reports. The beacon receiver and the FM receiver may be one unit provided as a VICS receiver, or each may be provided separately.

The traffic information may include a type of information, a mesh number to specify a mesh, a link number for specifying a road link which connects two points, for example, two intersections and for indicating the difference between inbound and outbound traffic on the road link, and link information indicating information corresponding to the link number. For example, when traffic information is congestion information, the link information may include data about the head of a traffic jam indicating a distance from the start point of the road link to the head of the traffic jam, the congestion degree, the length of the traffic jam indicating the distance from the head of the traffic jam to the end of the traffic jam, and a link required travel time indicating the length of time required to travel the road link.

The communication portion 38 may receive the map data, the statistical data, the travel history data, and various information such as traffic information and general information from the information center 51 through the network 63.

The information center 51 may include, for example, a controller (e.g., server 53), a communication portion 57 connected to the server 53, and memory (e.g., database (DB) 58). The server 53 may include a CPU 54, an RAM 55, and an ROM 56 as a control device and a calculating device. Data the same as the various data stored in the data storing portion 16 such as the map data, the statistical data, and the travel history data may be stored in the database 58. The information center 51 may provide current traffic information and various information such as general information sent from the road traffic information center and travel history data collected from a plurality of vehicles (the vehicle mounted with the navigation apparatus and/or other vehicles) in real time.

The forward monitoring device 48 may include a laser radar, a radar such as a millimeter wave radar, and/or a supersonic sensor, and such radars and sensors may be used individually or collectively to monitor a vehicle in front of the vehicle mounted with the navigation apparatus, a stop line, and/or an obstacle. The forward monitoring device 48 may detect a relative vehicle speed to the vehicle in front of the vehicle mounted with the navigation apparatus, an approach speed to a stop sign/obstacle as area information and calculates the distance between both vehicles and the time required to reach the next vehicle.

The rear view camera 49 including a CCD sensor is attached to the rear part of the vehicle and the optic axis of the rear view camera 49 is directed downward to monitor the area behind the vehicle. The rear view camera 49 may image a vehicle traveling behind the vehicle mounted with the navigation apparatus, a building on the side of the road, and/or a structural object as well as a feature, create image data of such an object, and send the image data to the CPU 31. The CPU 31 may read the image data, execute image processing, and determine each of the objects in the image as a specific object. A C-MOS sensor may be used instead of a CCD sensor.

Note that, the navigation system, the navigation processing portion 17, the CPUs 31 and 54, and the server 53 may function as a controller individually or collectively to execute processing using various programs and data. The data storing portion 16, the RAMs 32 and 55, the ROMs 33 and 56, the database 58, and/or the flash memory may function as a memory. For example, an MPU may be used as a processing device instead of the CPUs 31 and 54.

Next, a basic operation of the navigation system with the structure determined as described above will be described.

When the navigation apparatus 14 is activated by the driver' operation of the operating portion 34, the CPU 31 may read a current vehicle position detected by the GPS sensor 15 and a vehicle position detected by the direction sensor 18, and may initialize various data. Next, the CPU 31 may determine on which road link the current position is located on the basis of a movement locus of the current position, and a shape and a position of each road link of roads around the current position, and may specify the current position. The current position may be specified, for example, on the basis of positions of each feature that is imaged by the rear camera 49.

The CPU 31 may read image data from the rear camera 49 and may recognize a feature in an image within the image data. The CPU 31 may calculate the distance between the rear camera 49 and the actual feature on the basis of the position of the feature in the image. The CPU 31 may then read the distance described above, further read feature data from the data storing portion 16, obtain the coordinates of the feature, and specify the current position on the basis of the coordinates and the distance.

The CPU 31 may detect a current traveling lane on the basis of the recognized feature in the image data and the feature data read out from the data storing portion 16.

Note that, the CPU 31 may read an output from the geomagnetic sensor, determine whether there is an object which is made of a ferromagnetic material such as a predetermined manhole on the road on the basis of the output from the sensor, and detect a traveling lane on the basis of the determination. Further, the current position may be detected with high accuracy by using the high-precision GPS sensor 15. As a result, the traveling lane may be detected on the basis of the result of the detection of the current position. If needed, while image processing is executed for image data of display lines, the traveling lane may be detected by using the output from the geomagnetic sensor and the current position collectively.

The CPU 31 may read out and obtain the map data from the data storing portion 16 or to receive and obtain the map data from the information center 51 through the communication portion 38. Note that, when obtaining the map data from the information center 51, the CPU 31 may download the received map data on a flash memory.

The CPU 31 may display various screens on the display portion 35. For example, the CPU 31 may display a map screen on the display portion 35 and display an area map as well as the current vehicle position and the vehicle direction on the map screen. As a result, the driver may drive the vehicle on the basis of the map, the vehicle position, and the vehicle direction.

When the driver inputs a destination by operating the operating portion 34, the CPU 31 may set the destination. If needed, a starting point may be input and set. Further, if a predetermined point is stored in advance, the stored point may be set as a destination. When the driver inputs a search condition by operating the operating portion 34, the CPU 31 may set a search condition.

After setting the destination and the search condition, the CPU 31 may read out the current position, the destination, and the search condition, read search data from the data storing portion 16, search for a route from the starting point (e.g., the current position) to the destination on the basis of the search condition, the read current position, the destination, and the search data. The CPU 31 may then output route data indicating the searched route. In this case, a route that has the minimum total amount of link costs for road links on the route may be chosen as the search route.

When a road has a plurality of lanes and a current traveling lane is detected among the lanes, the CPU 31 may search for a route including the traveling lane. In this case, the lane number of the traveling lane may be included in the route data.

Note that, the information center 51 may execute route searching processing. The CPU 31 may send the current position, the destination, and the search condition to the information center 51. After the information center 51 receives the current position, the destination, and the search condition, the CPU 54 may read out search data from the database 58, searches for a route from the starting point to the destination on the search condition on the basis of the current position, the destination, an the search data, and outputs route data indicating the searched route. Then the CPU 54 may send the route data to the navigation apparatus 14.

The CPU 31 may provide guidance along the route. The CPU 31 may read the route data and may display the searched route on the map screen on the basis of the route data.

When the vehicle needs to turn right or left at a predetermined intersection while the route guidance is performed, the intersection is set as a guidance target point and as a turn intersection. The CPU 31 may determine whether there is an intersection at which the vehicle needs to turn right or left on the basis of the searched route of the route data. When there is such intersection, the intersection may be set as the turn intersection by the CPU 31. Note that, as the turn intersection, any intersection at which an entering road and a plurality of exiting roads are crossed with each other such as a junction of three roads, a right angle cross road, and a junction of five roads may be included.

When the route is searched at the lane level, the CPU 31 may recommend a lane. For example, a recommended traveling lane for passing through the turn intersection such as a suitable lane for entering to the turn intersection or a suitable lane for leaving from the turn intersection may be selected and set as a recommended lane. The CPU 31 may display the searched route on the map screen, display an enlarged view of the traveling road of the vehicle in a predetermined range of the map screen, and perform the lane guidance using the road enlarged view. In the road enlarged view, each lane and the set recommended lane may be displayed.

The CPU 31 may output audio route guidance from the voice outputting portion 37. The CPU 31 may set one or more than one route guidance points at each point which is in front of the turn intersection on the searched route and is a predetermined distance away from each other. When the vehicle arrives at each of the route guidance points, the route guidance for the turn intersection whose content is preset corresponding to each of the route guidance points may be performed. For example, route guidance for a distance from the vehicle position to the turn intersection or for a right or left turn at the turn intersection may be performed. When a recommended lane is set, The CPU 31 may perform the lane guidance whose content is preset corresponding to each of the route guidance points. For example, the lane guidance for each of recommended lanes between the vehicle position and the turn intersection or the lane guidance for a recommended lane coming after the turn intersection may be performed.

The CPU 31 may read out intersection data, display an enlarged view of the turn intersection within a predetermined area of the map screen before the vehicle arrives at the turn intersection, and perform route guidance using the intersection enlarged view. In this case, an area map around the turn intersection, the searched route, and a landmark such as a facility for recognizing the turn intersection may be displayed on the intersection enlarged view. When the entering road and/or the exiting roads at the turn intersection have a plurality of lanes and the lane guidance is being performed, The CPU 31 may display a recommended lane on the intersection enlarged view. Therefore, the intersection data may include data of the name of the intersection, the entering road, the exiting roads, a presence or absence of a traffic light, and the type of the traffic light.

As discussed above, when lane guidance is provided by voice, if the driver fails to hear the route guidance, or if the vehicle must turn right at the guidance intersection, but the recommended lane is the most left lane, the driver may be unable to drive the vehicle according to the lane guidance and end up driving in a lane other than the recommended lane by mistake. As result, the driver will be unable to drive the vehicle along the specified route.

Also, as discussed above, when the driver has changed into the recommended lane, if lane guidance is provided repeatedly, even if the vehicle is already traveling in the recommended lane, the driver feels that the superfluous lane guidance is annoying.

Therefore, according to this exemplary implementation, lane guidance may be provided in accordance with the movement of the vehicle.

Figure 2:
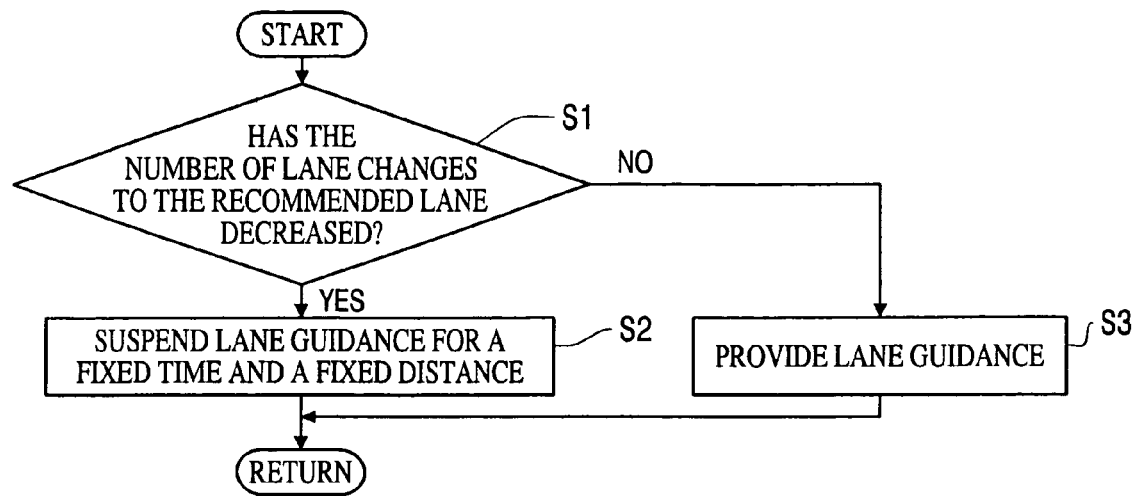
FIG. 2 is a flowchart showing an exemplary lane guidance method.
Figure 3:
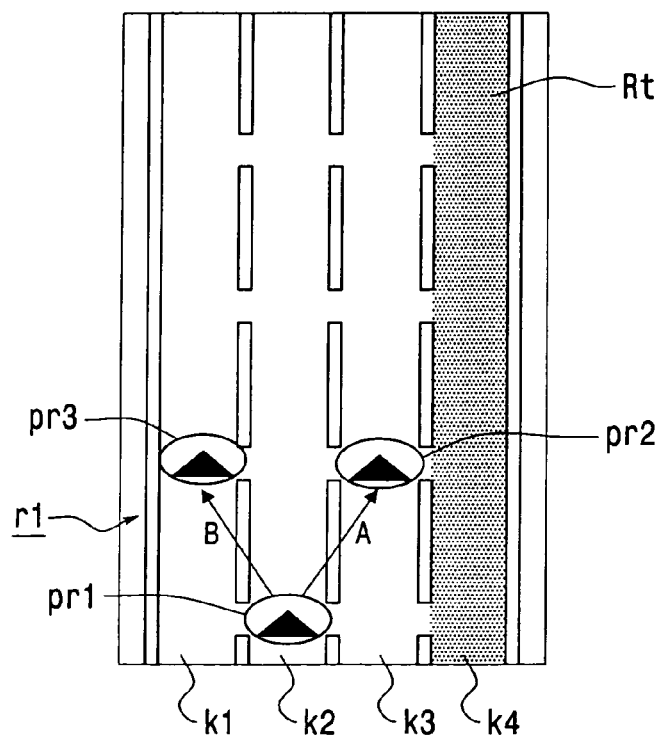
FIG. 3 is an explanatory drawing of exemplary lane guidance.

FIG. 2 is a flowchart showing an exemplary lane guidance method. FIG. 3 is an explanatory drawing of lane guidance. The exemplary method may be implemented, for example, by one or more components of the above-described system. However, even though the exemplary structure of the above-described system may be referenced in the description, it should be appreciated that the structure is exemplary and the exemplary method need not be limited by any of the above-described exemplary structure.

In FIG. 3, the reference numerals pr1 to pr3 denote vehicle positions, the reference numeral r1 denotes the road, the reference numeral Rt denotes the specified route, the reference numerals k1 to k4 denote lanes of the road r1. As shown in FIG. 3, the lane k4 is the recommended lane.

When, for example, the recommended lane k4 is set by the CPU 31 and lane guidance is executed to lead the vehicle into the recommended lane, the CPU 31 determines the movement of the vehicle. For that purpose, the CPU 31 may read the host vehicle position pr1 at the time that lane guidance is executed, and may starts measuring time by means of a timer. When a prescribed time interval t1 has elapsed after the lane guidance was executed, the CPU 31 may read the host vehicle position (e.g., pr2 or pr3). Note that the time interval t1 may be set only to a length of time at which the direction of movement from the host vehicle position pr1 can be determined, for example, the time required for the vehicle to move into an adjacent lane.

Next, the CPU 31, based on the relationship between the recommended lane and the host vehicle position pr2 or pr3, may determine the direction of vehicle movement, for example, by determining whether the number of lane changes necessary to move into the recommended lane from the host vehicle position in the lane k3 or the lane k1 has changed.

As shown in FIG. 2, the direction of vehicle movement may be determined by determining whether the number of lane changes necessary to be in the recommended lane k4 has decreased (step S1). Specifically, if the number of lane changes has decreased (step S1=Yes), the CPU 31 may conclude that the vehicle has moved in a direction of approaching the recommended lane (hereinafter called the approaching direction), as shown by arrow A in FIG. 3. If the number of lane changes has not changed (step S1=No), the CPU 31 may conclude that the vehicle has moved in a direction parallel to the recommended lane (hereinafter called the parallel direction). If the number of lane changes has increased (step S1=No), the CPU 31 may conclude that the vehicle has moved in a direction of away from the recommended lane (hereinafter called the diverging direction), as shown by arrow B in FIG. 3.

If the vehicle has moved in the approaching direction (Step S1=Yes), the vehicle may be considered to be on course, and the CPU 31 may suspend lane guidance for a prescribed interval. For this purpose, the CPU 31 may use the point in time when the movement direction was determined as a guidance suspension starting time and may starts measuring time using the timer. For this purpose, the CPU 31 may also take the vehicle position at the point in time when the movement direction was determined and records it in the RAM 32 as a guidance suspension starting position. Then, the CPU 31 may not execute lane guidance, for example, until the vehicle has traveled for a fixed time interval t2 after the guidance suspension starting time and/or for a fixed distance Lx from the guidance suspension starting position.

It should be appreciated that even if the time interval t2 elapses, if the vehicle has not traveled the distance Lx, it may be assumed that traffic is congested. As a result, the CPU 31 may not execute lane guidance until the vehicle has also traveled the distance Lx. Similarly, for example, even if the vehicle has traveled the distance Lx, if the time interval t2 has not elapsed, it may be assumed that the driver remembers the most recent lane guidance, the CPU 31 may not execute lane guidance until the time interval t2 has also passed. While both the time interval t2 and the distance Lx may be used, alternatively, only the time interval t2 or the distance Lx may be used.

By contrast, when the vehicle has moved in the parallel direction or the separating direction (Step S1=No), the vehicle may be considered to be headed off course, and the CPU 31 may execute lane guidance.

According to the above-described exemplary method, when the vehicle has moved in the approaching direction in relation to the recommended lane, lane guidance may be suspended. As a result, lane guidance is not executed repeatedly in cases where, for example, the vehicle is simply in the process of moving into the recommended lane and/or the vehicle is already traveling in the recommended lane. Because there is not repeated voice guidance, the driver will not be annoyed by superfluous lane guidance.

Moreover, according to the above-described exemplary method, because lane guidance is executed when the vehicle has moved in the parallel direction or the separating direction (e.g., the driver has failed to hear previous lane guidance, or the vehicle must turn right at the guidance intersection, but the recommended lane is the most left lane), the vehicle can reliably be driven according to the lane guidance. It is therefore possible to prevent the vehicle from being driven in a lane other than the recommended lane by mistake, so the vehicle can be driven along the specified route.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A route guidance system for a vehicle, comprising:
   a current position detector; and
   a controller that:
      searches for a route to a destination;
      sets a recommended travel lane based on the searched for route;
      receives a current position of the vehicle from the current position detector;
      determines a number of lane changes required to change from the current position to the recommended lane;
      when the determined number of lane changes has not decreased, provides lane guidance to lead the vehicle into the recommended lane; and
      when the determined number of lane changes has decreased determines that the vehicle is approaching the recommended lane and suspends lane guidance for a fixed time interval or for a fixed distance to be traveled by the vehicle.

2. The route guidance system of claim 1, wherein after the fixed time interval has elapsed or the fixed distance has been traveled, the controller:
   redetermines a number of lane changes required to change from an updated current position to the recommended lane; and
   redetermines a movement direction of the vehicle based on the redetermined number of lane changes.

3. The route guidance system of claim 1, wherein the controller suspends the lane guidance for a fixed time interval and for a fixed distance to be traveled by the vehicle.

4. The route guidance system of claim 3, wherein after the fixed time interval has elapsed and the fixed distance has been traveled, the controller:
   redetermines a number of lane changes required to change from an updated current position to the recommended lane; and
   redetermines a movement direction of the vehicle based on the redetermined number of lane changes.

5. The route guidance system of claim 1, wherein the controller provides additional lane guidance when the determined number of lane changes has not decreased.

6. A route guidance method for a vehicle, comprising:
   searching with a controller for a route to a destination;
   setting with the controller a recommended travel lane based on the searched for route;

receiving with the controller a current position of the vehicle;

determining with the controller a number of lane changes required to change from the current position to the recommended lane;

when the determined number of lane changes has not decreased, providing with the controller lane guidance to lead the vehicle into the recommended lane; and when the determined number of lane changes has decreased determining with the controller that the vehicle is approaching the recommended lane and suspending with the controller lane guidance for a fixed time interval or for a fixed distance to be traveled by the vehicle.

7. The route guidance method of claim 6, wherein after the fixed time interval has elapsed or the fixed distance has been traveled, the method further comprises:

redetermining a number of lane changes required to change from an updated current position to the recommended lane; and redetermining a movement direction of the vehicle based on the redetermined number of lane changes.

8. The route guidance method of claim 6, further comprising suspending the lane guidance for a fixed time interval and for a fixed distance to be traveled by the vehicle.

9. The route guidance method of claim 8, wherein after the fixed time interval has elapsed and the fixed distance has been traveled, the method further comprises:

redetermining a number of lane changes required to change from an updated current position to the recommended lane; and redetermining a movement direction of the vehicle based on the redetermined number of lane changes.

10. The route guidance method of claim 6, further comprising providing additional lane guidance when the determined number of lane changes has not decreased.

11. A non-transitory computer-readable storage medium storing a computer-executable program usable to provide route guidance, the program comprising:

instructions for searching for a route to a destination;

instructions for setting a recommended travel lane based on the searched for route;

instructions for receiving a current position of the vehicle;

instructions for determining a number of lane changes required to change from the current position to the recommended lane;

instructions for, when the determined number of lane changes has not decreased, providing lane guidance to lead the vehicle into the recommended lane: and instructions for, when the determined number of lane changes has decreased determining that the vehicle is approaching the recommended lane and suspending lane guidance for a fixed time interval or for a fixed distance to be traveled by the vehicle.

12. The route guidance system of claim 1, wherein after the fixed time interval has elapsed or the fixed distance has been traveled, the controller:

resumes lane guidance before the vehicle reaches a next guidance target point toward which the vehicle was approaching prior to the suspension of lane guidance.

13. The route guidance method of claim 6, wherein after the fixed time interval has elapsed or the fixed distance has been traveled, the method further comprises:

resuming lane guidance before the vehicle reaches a next guidance target point toward which the vehicle was approaching prior to the suspension of lane guidance.

14. The computer-readable storage medium of claim 11, wherein after the fixed time interval has elapsed or the fixed distance has been traveled, the program further comprises:

instructions for resuming lane guidance before the vehicle reaches a next guidance target point toward which the vehicle was approaching prior to the suspension of lane guidance.

15. The route guidance system of claim 1, wherein the controller:

suspends lane guidance for the fixed time interval and for the fixed distance to be traveled by the vehicle when the determined number of lane changes are decreased.

16. The route guidance method of claim 6, wherein the method further comprises:

suspending lane guidance for the fixed time interval and for the fixed distance to be traveled by the vehicle when the determined number of lane changes are decreased.

17. The computer-readable storage medium of claim 11, wherein the program further comprises:

instructions for suspending lane guidance for the fixed time interval and for the fixed distance to be traveled by the vehicle when the determined number of lane changes

* * * * *